US012621412B1

(12) United States Patent
Bhat et al.

(10) Patent No.: US 12,621,412 B1
(45) Date of Patent: May 5, 2026

(54) SYSTEM AND METHOD FOR CORRELATING INTERACTION TO METADATA

(71) Applicant: Morgan Stanley Services Group Inc., New York, NY (US)

(72) Inventors: Vishal Bhat, Edison, NJ (US); Hemal Patel, Jersey City, NJ (US); Srinivas Alladi, Princeton Junction, NJ (US); Manoj Arora, East Brunswick, NJ (US); Brennan Jablonski, New York, NY (US); Srinivas Devalapalli, Cumming, GA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/285,253

(22) Filed: Jul. 30, 2025

(51) Int. Cl.
*H04N 7/15* (2006.01)

(52) U.S. Cl.
CPC .................................. *H04N 7/155* (2013.01)

(58) Field of Classification Search
CPC .. H04N 7/14; H04N 5/91; H04N 7/15; H04N 23/698; H04L 12/18; H04L 51/046; H04L 51/216; H04L 67/306; H04L 12/1831; G06F 40/35; G06F 40/58; G06F 16/532; G06F 16/54; G06Q 10/101; G10L 15/26
USPC ...................................................... 348/14.08
See application file for complete search history.

(56) References Cited

U.S. PATENT DOCUMENTS

| | | | |
|---|---|---|---|
| 11,315,569 B1 * | 4/2022 | Talieh ................. | H04L 12/1831 |
| 11,451,407 B1 | 9/2022 | Iyer et al. | |
| 2016/0323330 A1 | 11/2016 | Holst et al. | |
| 2019/0190908 A1 | 6/2019 | Shen et al. | |
| 2020/0258051 A1 | 8/2020 | Ma | |
| 2023/0308607 A1 * | 9/2023 | Kaku ................... | H04N 23/698 |
| 2023/0353704 A1 | 11/2023 | Springer et al. | |
| 2023/0419966 A1 | 12/2023 | Roper | |
| 2024/0004921 A1 * | 1/2024 | Kai ....................... | G06F 16/532 |
| 2024/0146784 A1 | 5/2024 | Kokajko et al. | |
| 2024/0235870 A1 * | 7/2024 | Chen ................... | H04L 12/1827 |
| 2024/0267245 A1 | 8/2024 | Ittelson et al. | |
| 2024/0414018 A1 | 12/2024 | Phillips et al. | |
| 2025/0080372 A1 * | 3/2025 | Dong ................. | G06Q 10/1093 |

* cited by examiner

*Primary Examiner* — Maria El-Zoobi
(74) *Attorney, Agent, or Firm* — PEARL COHEN ZEDEK LATZER BARATZ LLP

(57) ABSTRACT

A system and method may link or correlate interaction data such as video recordings to videoconference interactions or meetings from which that interaction data is produced, by sending or transmitting an identifier (e.g. e-mail address) of a participant in a communications application interaction to a global communications application process. The global communications application process may respond to the identifier with a unique identification associated with the interaction. The unique identification of the interaction may be used to access or search for interaction data associated with or produced from the interaction.

20 Claims, 5 Drawing Sheets

Ⓚ     Ⓛ

350

Ⓜ → Is Recording Available ?

Yes → Are there Multiple Videos ? — 372

364

Ⓝ — No → Update Status to Reprocessing

No

No

No

No

374 — Download Single Video

376 — Download All Videos to NAS

Yes

378 — Send Entries to Kafka for Scalar Processing

380 — Is Scalar connection Successful ?

Yes

382 — Create entries in DB capturing UUID, Recording ID (Status = Blank)

Ⓞ

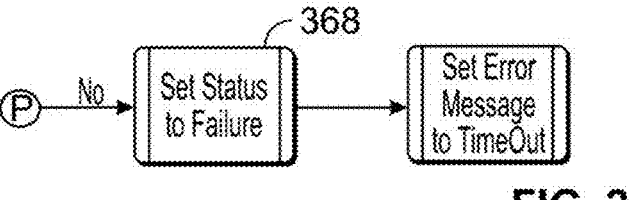

368 — Ⓟ → No → Set Status to Failure → Set Error Message to TimeOut

FIG. 2 (cont.)

SYSTEM AND METHOD FOR CORRELATING INTERACTION TO METADATA

FIELD OF THE INVENTION

The present invention relates generally to interaction (e.g., videoconference) technology, such as correlating or associating interaction data such as interaction recordings with interactions.

BACKGROUND OF THE INVENTION

Organizations may have employees such as agents or financial advisors (FAs) or other advisors communicate with clients or customers using various platforms, such as e-mail, telephone, teleconferencing platforms, and may use customer relationship management (CRM) software to manage these interactions. CRM software may include tools provided by Salesforce, Inc. to interact with a customer and to manage the interaction, e.g., storing customer records. Software tools may then summarize the interaction, e.g. as an e-mail to a client, and populate notes or other information regarding the interaction into a CRM system. For example, Morgan Stanley's Debrief tool may act as notetaker, summarizer and first draft communication composer for client interactions. Based on an interaction or meeting, such as a teleconference, Debrief may summarize key points discussed in the meeting, create an email or other document for an advisor to review, edit and send, and saves notes into CRM software such as a Salesforce system. Recordings such as video or audio recordings may be made from interactions: for example the Zoom platform may allow recording of video meetings. In an organization which conducts hundreds or thousands of meetings a day, it may be difficult to accurately associate or correlate the many recordings made from these meetings with the meetings themselves.

SUMMARY

A system and method may link or correlate interaction data such as video recordings to videoconference interactions or meetings from which that interaction data is produced, by sending or transmitting an identifier (e.g. e-mail address) of a participant in a communications application interaction to a global communications application process. The global communications application process may respond to the identifier with a unique identification associated with the interaction. The unique identification of the interaction may be used to access or search for interaction data associated with or produced from the interaction.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
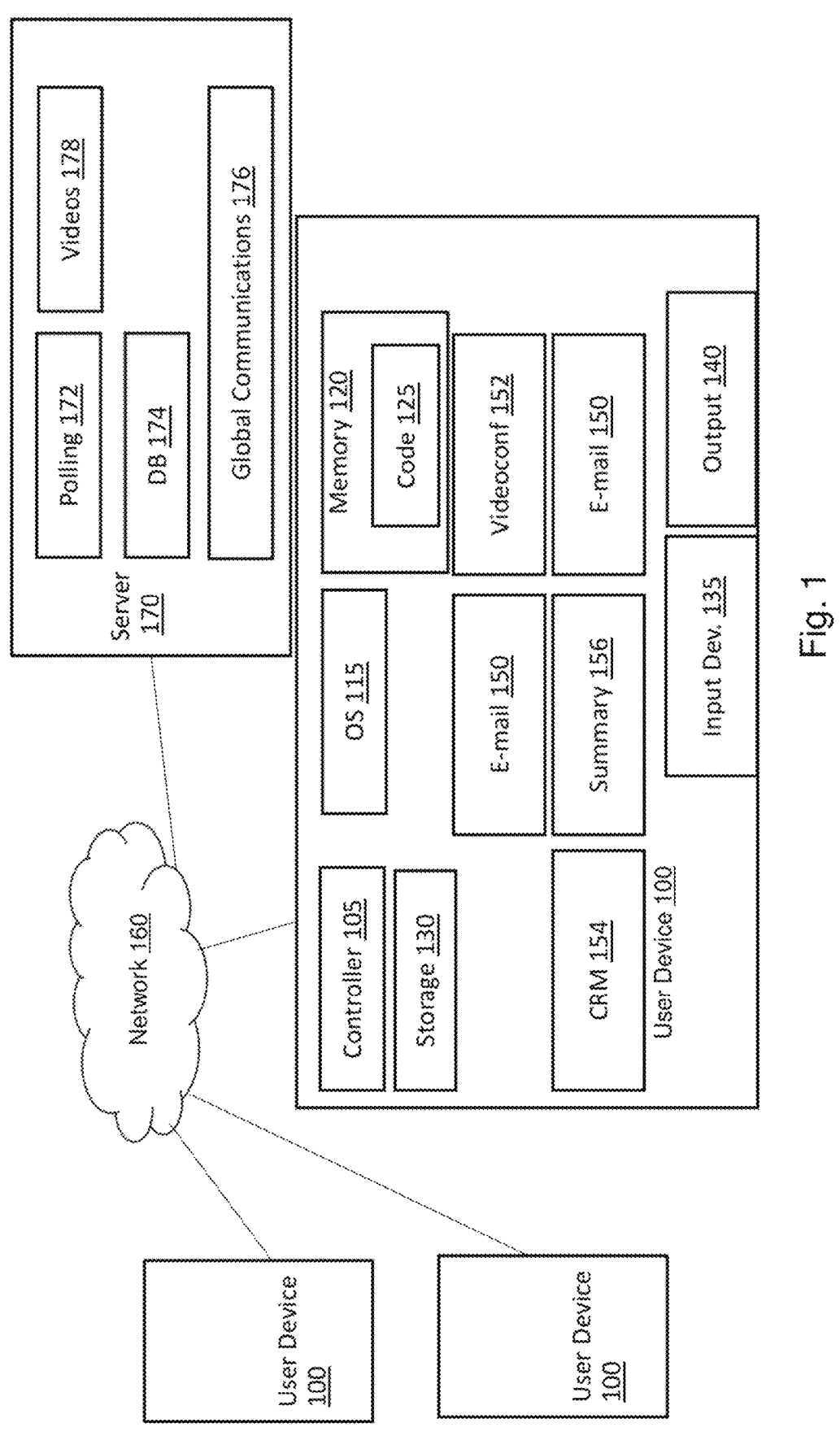
FIG. 1 depicts an example system according to some embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 2:
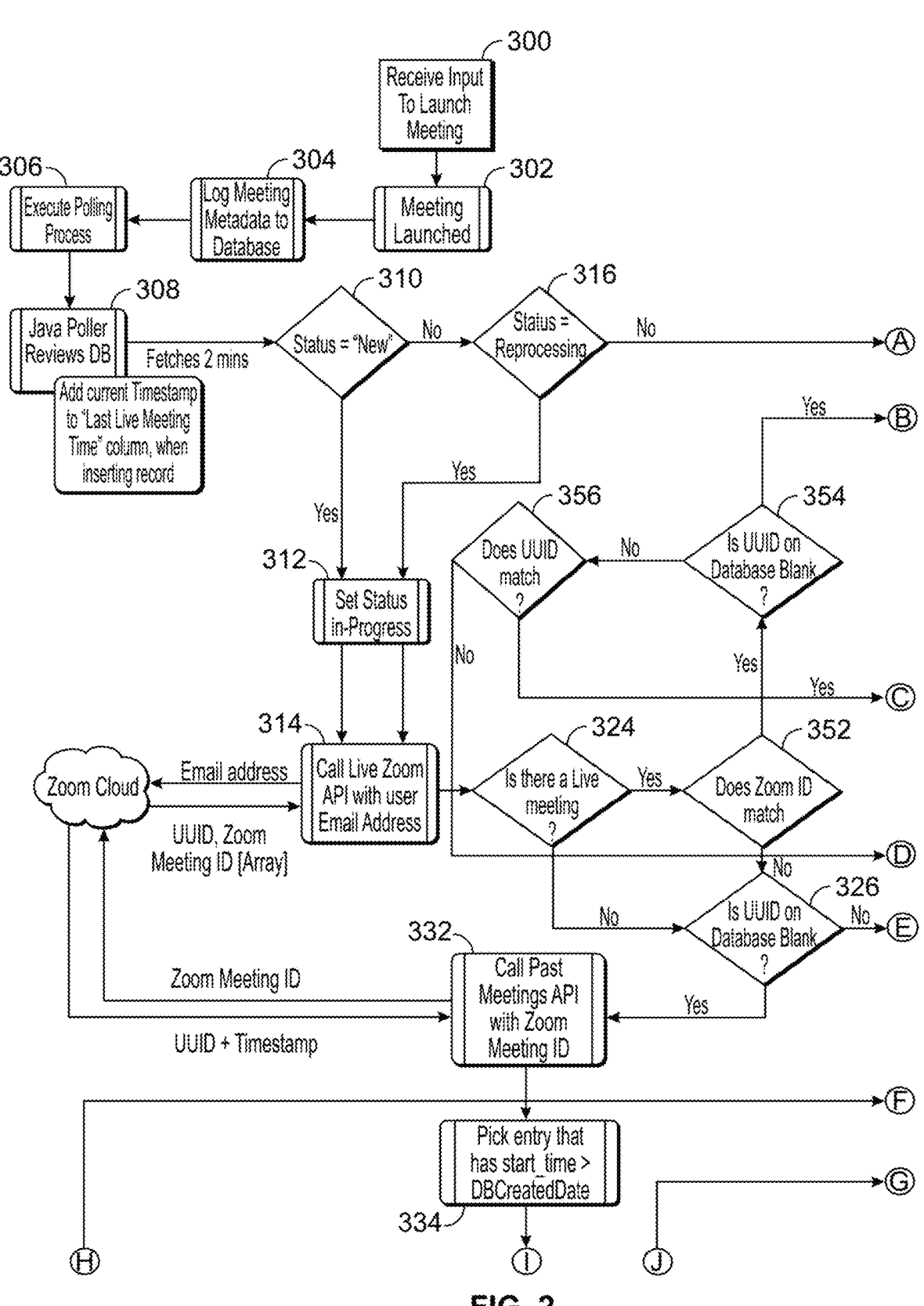
FIG. 2 shows a flowchart of a method for correlating interaction data to interactions according to embodiments of the present invention.
Figure 2:
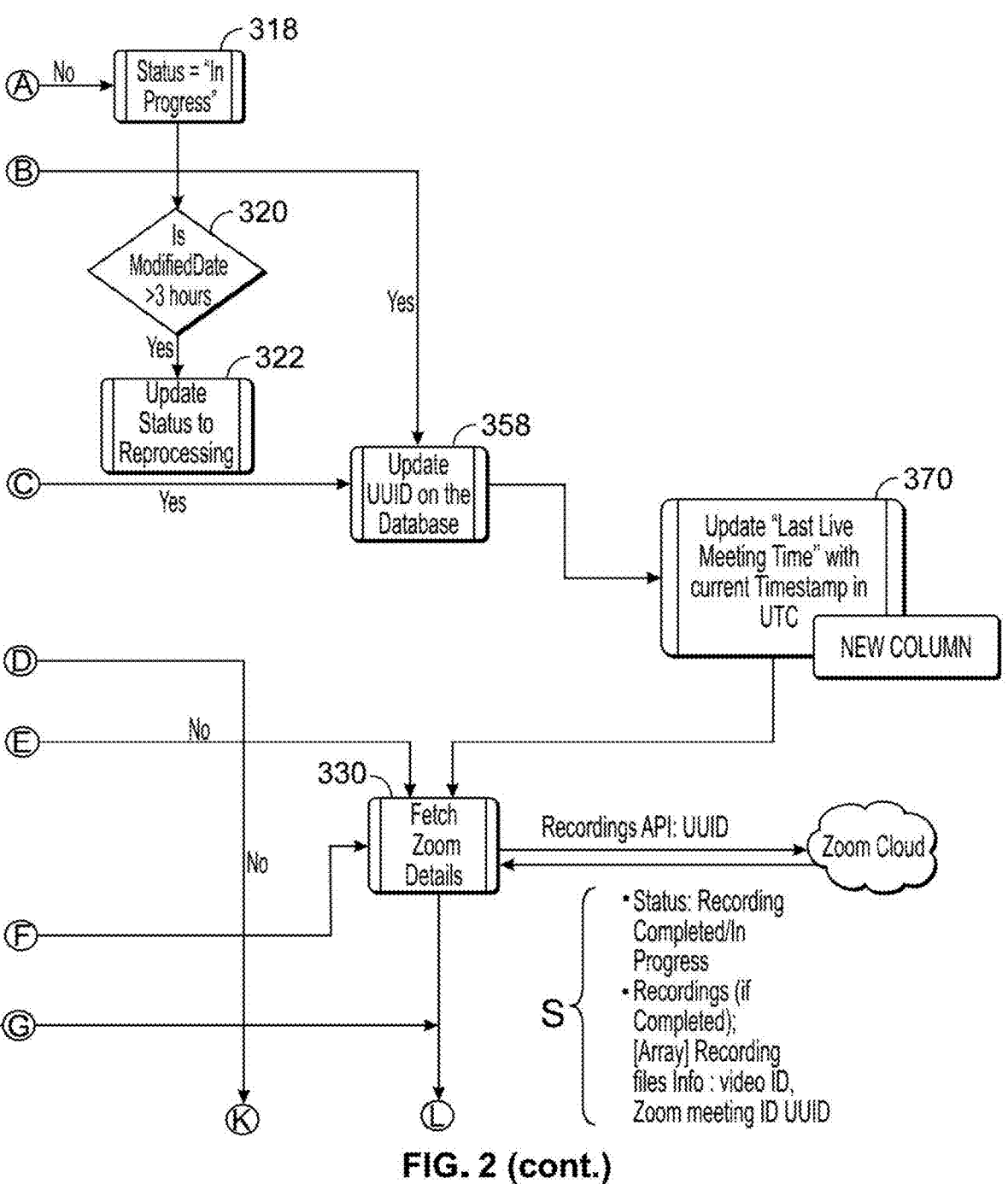
Figure 2:
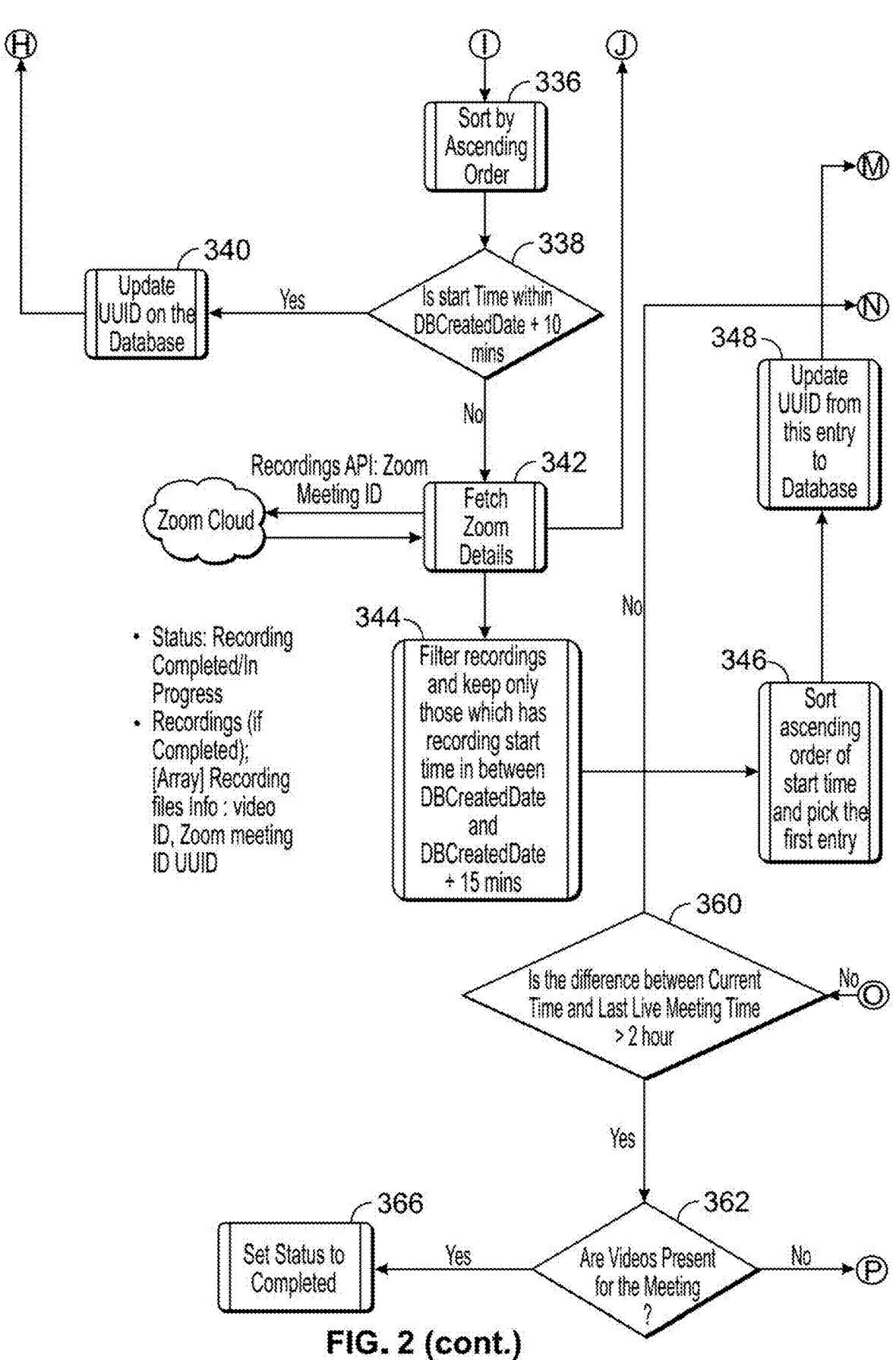

When an interaction is instantiated, e.g. when a Zoom meeting starts, it may not be automatic that a unique identifier (e.g. UUID) is provided. An embodiment may find and record this unique identifier when an interaction is instantiated. Further, it may be not clear which unique identifier corresponds to which meeting ID (e.g. Zoom ID): such a correlation may be needed to access the correct recording of the interaction. An embodiment may automatically correlate, link or associate to specific instances of interactions, data created for those instances, when using a videoconferencing or communications application (e.g. the Zoom platform). For example video or other recordings or interactions created when using such applications may be linked or associated to those interactions. This may improve such technology for example in the cases when the association between some of among many video recordings and individual interactions is not clear. Embodiments may achieve this using a series of fallbacks or attempts, as shown in the flowchart of FIG. 2.

Personnel such as FAs may use interaction platforms to conduct interactions such as Zoom platform meetings. To schedule these interactions, an FA may use an e-mail plat-form send an e-mail with a link such as an URL or other link to the other party (e.g. a client) who may join the interaction using the link—the link may include a meeting ID (e.g. meeting ID) which may be used to instantiate a specific instance of a meeting, which may have a unique ID (e.g. UUID). An e-mail platform may, behind the scenes, change the typical way the interaction (such as via Zoom) is launched. For example, instead of a user clicking (e.g. using a mouse) "join Zoom" a user may click on a different link which may connect to a CRM system. The CRM system may attempt to correlate the second party (e.g. client) to find clients correlating to the first party (e.g. the FA) to, for example, confirm this client as appropriate (e.g. is a United States US client per some regulations). The client(s) found may be presented to the first party who may then approve this.

The challenge may be to conclusively associate the inter-actions or meetings held with the results of the meetings, such as video recording. This may be difficult, since for example: many parties (e.g. clients) have the same names; parties may use multiple e-mail addresses or other contact information; meetings may be held or initiated using links other than those used to schedule meetings; the unique ID used for clients is typically not used to schedule meetings; meeting links may be re-used for multiple instantiations of the same meeting; etc.

One party to an interaction may click on a record button to generate an audio and/or video recording of the interac-tion. This may cause the interaction platform to perform a backend call to a CRM (e.g. Salesforce) application which may include meeting metadata (e.g. subject and Zoom ID). An embodiment may create for each new instance of an interaction an entry in a global, centralized database or table (e.g. an SQL table) with a status such as new; this may be created, for example, when a meeting is launched or instan-tiated. One or more processes such as a Java process may be executed periodically (e.g. every two minutes), accessing this global table, searching for entries with status new and/or status "reprocessing" (e.g. indicating the interaction has been processed before and is not being "held" as being in-process or in-progress, and is also not new). Each process typically selects a group (e.g. 10) of records having the earliest timestamp, and for each of these found interaction or meeting entries, the process may mark the record as e.g. "in progress" to hold the record and ensure another process does not use the record, may query or call to a global commu-nications application process (e.g. a Zoom process handling all Zoom meetings for an organization) asking if there is an ongoing or instantiated meeting corresponding to the meet-ing ID sent in the query. The global communications appli-cation process may return a unique ID for the meeting instance and may record in this in the global table with status of for example reprocessing. The table may record informa-tion such as meeting start and end times, or other informa-tion. While specific status markers or labels such as in progress and new are discussed, other terminology or status markers may be used.

A challenge may be in conclusively associating record-ings created for the interaction or meeting with the interac-tion or meeting, for example, since multiple parties known to the organization may have the same name, or other reasons. In some embodiments, in order for a proper client experience, if a client sets up a meeting, they may not provide the unique ID known to the organization that differentiates different clients; rather the client may use as an ID an e-mail address which may not be known to the organization. In addition, meeting links may be re-used, with each instantiation of the re-use having a unique ID.

In some interaction platforms such as the Zoom platform, an interaction ID or meeting ID (e.g. Zoom ID) may encompass or be used for an overarching series of separate instantiations of meetings, and may be used to create a specific unique instance of an interaction—e.g. one meeting using the interaction ID. Each such instance may have its own unique identification, e.g. a unique meeting UUID, where multiple instances, each having a UUID, correspond to one interaction or meeting ID. Once a meeting is held based on a given meeting ID, the instance of that meeting will have a unique UUID generated for that particular instance. In one embodiment, a meeting ID is a 10 or 11-digit number.

Embodiments may improve interaction recording tech-nology by capturing "edge" cases where interaction record-ings captured may be lost or orphaned and not connected to an interaction. Some edge cases which may in the prior art cause lost or orphaned recordings, but which may be detected by embodiments of the invention include:

The same meeting ID (e.g. Zoom ID) used multiple times for multiple meeting instantiations.

A user clicks on a meeting link to start a meeting and quickly closes the meeting, not giving sufficient time for a process such as a global Zoom process to create a unique ID (e.g. UUID).

A user starts a meeting before the scheduled start time.

A user starts the same meeting—e.g. a meeting using the same link—multiple times (e.g. one after another).

A user records multiple videos as part of the same meeting.

FIG. 1 depicts an example system according to some embodiments. A set of user devices 100 such as personal computers or smartphones may be used by parties to inter-actions to set up, schedule, and participate in interactions, record interactions, communicate regarding and schedule interactions, create summaries (e.g. using a summary tool) of interactions, and perform other functions discussed herein. A server 170 may also perform some of such functions, e.g. by hosting teleconferencing applications, global teleconference applications (e.g. a Zoom cloud), data repositories (e.g. network attached storage (NAS)), sum-mary tools, databases, etc. The details of one user device 100 are shown; however other user devices 100 and server 170 may include components similar to the user device 100 with details shown; e.g. server 170 may include a processor, memory, etc. which perform some or all of the operations described herein, e.g. by executing polling process 172.

A user device or server may include an e-mail, personal information management, and calendar system 150 (e.g. the Outlook system from Microsoft) which may be used to schedule interactions or meetings, and communicate the scheduling of and links to these meetings. A user device may include communications, videoconferencing or teleconfer-encing application 152 (e.g. the Zoom system), and a customer relations management (CRM) system 154 such as a system provided by Salesforce. An interaction evaluation system or summary tool 156 acting as a notetaker, summa-rizer and first draft communication composer for client interactions, such as the Debrief tool from Morgan Stanley, may review interactions and meetings occurring using e-mail system 150 and communications or teleconference application 152 and produce output, for example populated into CRM system 154. Such output may be a summary of what was "said" during a video or telephone call, or action items resulting from the call. CRM system 154 may maintain a history of meeting invites and provide reminders for the first party, creating a meeting, to start hosting the meeting.

Server 170 may include a polling process 172 such as a Java process to correlate interaction data to interactions; a global table or database 174 storing entries for interactions including, e.g. interaction IDs, unique IDs, etc.; a global communications application process 176, such as a Zoom cloud process, keeping track of interactions instantiated using teleconference applications 152; and other global storage such as interaction (e.g. video) repository 178 storing the recordings, such as a NAS system. While certain functions and modules are shown executing on server 170 and others on a user device 100, in different embodiments modules and functions may be located differently.

Summary tool 156 may input data a meeting held by videoconferencing or teleconferencing application 152 and possibly other data, may use artificial intelligence (AI) tools such as generative neural networks and may generate notes or summaries of the interactions or meetings, action items to be taken based on those meetings, and draft e-mail messages for review including these summaries and/or action items.

Devices 100 and 170 may be connected by one or more networks 190, such as a telephone system (e.g. POTS), the internet, or an intranet.

A set of example components such as a processor, memory, etc. are shown in one device 100, and other devices 100 and 170 may include similar or other components. User device 100 may be one or more computer systems including a controller 105 that may be, for example, a central processing unit processor (CPU) or any other suitable multipurpose or specific processors or controllers, a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as modules, such as e-mail processes, interaction platforms, summary tool 156, polling process 172 etc. described herein, for example when executing code 125. One or more devices such as user device 100 and or server 170 may carry out functions such as those described in FIG. 2.

Operating system 115 may be or may include any code segment to coordinate, schedule, or otherwise manage operation of computing device 100, for example, scheduling execution of software programs or enabling modules to communicate. Memory 120 may be or may include, for example, a Random Access Memory (RAM), a read only memory (ROM), a Dynamic RAM (DRAM), a Flash memory, a volatile or non-volatile memory, a cache memory, or other suitable memory or storage units. Memory 120 may be or may include a plurality of, possibly different, memory units. Memory 120 may be a computer or processor non-transitory readable medium, or a computer non-transitory storage medium, e.g., a RAM. Executable code 125 may be any executable code, e.g., an application, a program, a process or script. Executable code 125 may be executed by controller 105 possibly under control of operating system 115. One or more executable code 125 segments may configure controller 105 perform methods disclosed herein, and one or more executable code segments 125 may be loaded into memory 120 and cause controller 105, when executing code 125, to carry out methods described herein.

Storage system 130 may be or may include, for example, a hard disk drive, a CD-Recordable (CD-R) drive, a universal serial bus (USB) device or other suitable removable and/or fixed storage unit. Data used with methods described herein may be stored in storage system 130 and may be loaded from storage 130 into memory 120.

Input device(s) 135 may be or may include a mouse, a keyboard, a microphone, a touch screen or pad or any suitable input device. Output device(s) 140 may include one or more displays or monitors, speakers and/or any other suitable output devices. Any suitable number of input or output devices may be used. For example, a wired or wireless network interface card (NIC), a printer, or a universal serial bus (USB) device may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While specific elements and modules of FIG. 1 are shown as an example hosted by specific computers, in other embodiments, such elements may be hosted by other computers, in cloud based systems, etc.

FIG. 2 shows a flowchart of a method for correlating, linking or associating interaction data to interactions according to embodiments of the present invention. The operations of FIG. 2 may be performed by computer systems and modules shown in FIG. 1, but other computer systems, and other modules, may be used. As with other flowcharts herein, while an exemplary method is depicted for illustrative purposes in the flowchart of FIG. 2, it will be appreciated by those skilled in the art that features and operations from this procedure may be selectively combined with features and operations from alternative embodiments of the invention without departing from the remit of the disclosure. Further, while certain features and operations are expressly included in the flowchart of FIG. 2, it will be appreciated by those skilled in the art that not all depicted features and operations are mandatory elements, and that different embodiments may omit certain features or operations without departing from the remit of the disclosure. Accordingly, embodiments including combinations of the features and operations recited in FIG. 2 are expressly within the remit of the disclosure and do not constitute an intermediate generalization of the same.

In operation 300 a computer processor may receive a user or other input to launch an interaction such as a videoconference or audio meeting (e.g. a Zoom meeting). Such input may be a user clicking a launch button, and may be into a CRM process (e.g. Salesforce system), a videoconference or audio meeting process, or other process. For example a Salesforce Outlook plugin may in response to user input start an instance of a meeting, and audio recording may start after a user provides input to (e.g. clicks on) a Record button in a Zoom process.

In operation 302 an interaction (e.g. videoconference or audio meeting) is launched or instantiated, and a unique identifier, e.g. UUID, is created for the instantiation of that meeting, for example by the videoconference or audio meeting process. Typically the UUID is a separate data item from, with separate meaning from, a meeting ID. The unique identifier may identify a meeting instance (e.g., associated with an interaction), and may be used for distinguishing between instances or instantiations or meetings including those that might use the same meeting ID: typically only one unique identifier for an interaction or meeting exists at once within an organization. The meeting ID may refer to a scheduled meeting and may be reused across time for multiple different instantiations of meetings (each with its own different unique identifier, but the same meeting ID). Thus multiple different unique identifiers may correspond to one meeting ID. For example, a Zoom process may generate a meeting ID and then use this meeting ID to start meeting; participant may join the meeting with same meeting ID.

In operation 304 the processes responsible for the meeting launch or instantiation (e.g. a CRM and/or videoconference process) may, on or in reaction to the start of an interaction or meeting instance, create an entry in a centralized database or table and associate an interaction ID created in conjunction with the scheduling of an interaction with the entry, e.g. by adding the information to the entry. For example, the processes may log or transmit interaction or meeting metadata (e.g. subject, organizing party or meeting owner and/or this party's identification (e.g. an e-mail address), meeting ID, meeting start and end times, participant lists, etc.) to a centralized or global database (such as global table 174), which may create a new entry for this newly launched instantiation of an videoconference meeting or interaction. In one embodiment, a "client" or other participant email address is not in this metadata, but rather is stored in a field in a CRM system, which will be tied to a final note created and sent to a CRM system. The centralized database may be for example a global (to the organization) SQL table, holding information for all instantiations of electronic meetings held or being held for the organization. Among the data items for the meeting in the database may be a status, and a newly created meeting entry in the database may be given the status "new", a timestamp marking when the process creating the entry created the entry, or when it first noticed the existence of a live meeting for the interaction. The new entry may include a "last live meeting time" column or field indicating the last time it was detected that this meeting was instantiated, and the process may insert the current time in this column. Other statuses, and other data items for meeting entries, may be used. Typically, the new entry does not include a unique identifier, e.g. UUID, for this meeting, at the time of the creation of the entry.

In operation 306 a polling process that executes periodically (e.g. every two minutes), repeatedly, or continually, such as a Java application or process (e.g. polling process 172), may execute. The polling process may alternately start in another manner, e.g. being triggered by a new entry in the centralized or global database. In operation 308 the polling process may review or poll the centralized database to process meeting entries in the database, for example those marked as "new" or "reprocessing", and/or may check for currently executing or live meetings associated with the stored metadata. Operation 306, the polling process executing, may recur periodically or may be continuous. In one embodiment, the polling process starts, processes a subset or group (e.g. 10) database entries each corresponding to a meeting (e.g., setting the database entry for each meeting to be processed to "in progress" to mark or lock the entry as being processed, so another polling process does not process the entry; and setting the status to "reprocessing" after processing); and then exits. Thus a polling process may, when starting, take X (e.g. 10) records (e.g. the records with the earliest date and time stamp, where the records are ordered by date) and change the status in the global table to in-progress. Typically, after a polling process processes the group of records it has locked (e.g. with in progress), it exits, and when it restarts it locks and processes a second group of records: the second group of records may include meetings that were processed but which did not complete during a previous polling process execution, and/or records not yet processed by any polling process. In this manner, one or more polling processes may process a large number of meetings, some more than once (if appropriately marked). A record or meeting marked "complete" is typically not processed again; a record or meeting marked "new" or "reprocessing" is typically processed. Other labels may be used.

Multiple (e.g. four) polling processes may each work concurrently, ensuring they do not process the same records by the use of status entries in the global database such as reprocessing, etc. For example, operations such as transmitting of an identifier to a global process, accessing and storing interaction data, etc. may be performed by a polling process repeatedly executing and terminating, wherein a plurality of such processes execute concurrently. Different polling processes may execute on or by different systems each including a memory and a processor as in the example system shown in FIG. 1. In one implementation, multiple (e.g. four) Java servers execute in parallel, and each Java server executes a polling process periodically, e.g. every two minutes, where every period (e.g. every two minutes) each of the concurrent Java polling processes review a set (e.g. ten) interactions from the global database. Processing a smaller "batch" or subset, e.g. 10, allows for locking fewer interactions for processing at once.

The polling process may review one of the group or subset of interactions or interaction records set to be processed during this execution of the process at a time; the operations discussed in this example flowchart are for one meeting entry. However, typically, the polling process performs these operations for each meeting entry in the subset selected during each execution session (e.g. once every two minutes), for example sequentially.

In operation 310, for a given entry or meeting in the centralized or global database, if the status (e.g. the status in the global or centralized database entry associated with the meeting) is "new", or the status is "reprocessing" (operation 316), the polling process in operation 312 may set the status to "in-progress", and then may in operation 314, transmit an identifier (e.g. e-mail address) of a participant in a communications application interaction (e.g. Zoom meeting) to a global communications application process (e.g. a Zoom cloud process) and receive a meeting ID and unique ID (e.g. UUID). This may be done, for example, using an API provided by a Zoom process. In one embodiment, the e-mail address is that of the meeting organizer who is internal to the organization (e.g. an FA) rather than that of an external person; other identifiers may be sent. For example, in operation 314 a polling process may call a process global to the organization to obtain the unique identifier. e.g. UUID, for the meeting or interaction instance. If in operations 310 and 316 the status is not "new" or "reprocessing" (e.g. the status is "in progress"), the process may move to operation 318. For example, the polling process may call a "Zoom cloud" or other meeting process global to the organization, which holds data on all meetings held with a certain meeting platform (e.g. the Zoom platform) at that organization. To do this, the polling process may send in the request to the global process some identifier for the meeting, such as the e-mail address or other personal identification for one of the parties specified in the meeting, and also possibly the meeting ID for the meeting being queried. Typically, a record seen as marked in-progress when it is first accesses by a polling process is not processed unless its timestamp indicates it has been "stuck" in-progress for a long period of time.

Typically, if a meeting record is picked up for processing, its status is set to "in progress" or a similar label indicating the polling process is processing the record, so it will not be processed by another, parallel, process; before exiting the polling process status is typically set to reprocessing or completed. For example, a group of 10 records is picked up by a polling process and first are set to "In Progress" and then the next steps in the flowchart are executed for each record.

The global communications application process may respond to the transmitted identifier by transmitting a unique identification or identifier associated with the instantiated (e.g. live) interaction or meeting; a process such as polling process 172 may receive the unique identifier. For example, if a currently instantiated, e.g. "live" meeting is taking place for the queried identifier, the global process may return the unique identifier associated with the meeting, e.g. UUID, to the polling process, possibly along with the meeting ID (e.g. Zoom ID). If a currently instantiated, e.g. "live" meeting is not taking place for the queried identifier, the global process may return blank or no information for the unique identifier.

In operation 318, for the entry (e.g. for an interaction or meeting) in the centralized database being processed, the status (e.g. the status in the global database entry associated with the meeting) has been found to be "in progress", then in box 320, if the modified date or time (e.g. indicating the last time the entry was updated) for the database entry for the meeting is more than a threshold duration in the past, e.g. more than three hours old, then the status for the database entry may be modified to "reprocessing" in operation 322; otherwise the status may remain unchanged. This may be done to correct an error condition where the status is stuck at in-progress or processing; the status for the next run of the polling process may be reset to reprocessing. While status descriptions of new, reprocessing, in progress are used as examples, other status descriptions may be used.

In some cases, a process such as the polling process may fail, and/or the status of an entry in the global database may remain at in-progress, which without a further check may mean the interactions corresponding to the in-progress status entry may be ignored. Thus checking if the modified date is more than a threshold duration in the past may correct for this condition by changing such entries to status reprocessing.

After the database entry is updated for reprocessing the process may move to the next meeting of the set of meetings (e.g. ten) being processed in this session; if no more meetings the polling process ends, and may be restarted after a period of time (e.g. two minutes).

In operation 324, if it is determined a live, instantiated meeting, is not taking place for the queried identifier, the process may move to operation 326. If it is determined that a live or instantiated meeting is taking place, the process may move to operation 328.

In operation 326, if there is no unique identifier in the global or centralized database or table entry associated with the interaction or meeting, the process may proceed to operation 330; if there is a unique identifier (e.g. UUID is not blank) the process may proceed to operation 332. A unique identifier may be blank or missing if a meeting application such as Zoom failed, if the meeting or interaction was ended soon after being instantiated, or if a party did not show up for the instantiated meeting: embodiments may include functionality in order to not erroneously assign the wrong unique identifier to a database entry with a blank or missing unique identifier.

If no live interaction or meeting is present, the global communications application process may be queried, e.g. using the meeting ID, to return a list or array of all meetings that have been instantiated or taken place (e.g. in the past) with this meeting ID. Thus, in operation 332 the polling process may transmit a meeting ID for an interaction to the global communications application process and may receive a list or array of unique identifiers for past interaction instantiations, along with a timestamp for the start of each instantiated interaction. If the unique ID for an entry is blank or not captured, a past meetings API may be queried to fetch the proper UUID. In cases where the unique ID cannot be captured during a live meeting, such as during an outage in the polling process where the meeting concludes before the polling process recovers, an entry may be created without the unique ID. To address this, a Past Meetings API may be activated to retrieve a list of unique IDs associated with the corresponding meeting ID. The unique ID closest to the timestamp of when this entry was created may be selected and recorded. This may serve as a fail-safe mechanism to ensure UUIDs are appropriately captured even in exceptional scenarios.

In operation 334 the polling process may select, among the list retrieved from a Past meetings API, a list of unique IDs having a start time later than the time the entry in the database being processed was created (e.g. start Time from the API response>DBCreatedDate, which is a field in the table that as the UTC formatted timestamp of when the entry was created in the DB).

In operation 336 the list of UUIDs may be in ascending time order.

In operation 338 a process may traverse the list from earliest to latest, based on the sorted order (e.g., based on a DBCreatedDate field), and if in the sorted list a meeting start time is within a threshold time (e.g. 10 minutes) of the creation time of the entry for the meeting in the global database ("yes"), indicating that for this past meeting where there is no live meeting, this is the unique ID or recording start time closest in time to the database timestamp, the process may proceed to operation 340; if not, the process may proceed to operation 342.

In operation 340, the unique ID in the global database may be updated with the unique ID of the meeting or interaction, and the process may proceed to operation 330.

In operation 342; the polling process may call a global communications application process to obtain the status of and/or obtain recordings for the meeting being investigated. The polling process may identify the relevant meeting by sending the meeting ID to the global communications application process. A returned status may be for example that a recording of the interaction or other interaction data (e.g. video and/or audio meeting recording data) has been completed or is available, or is still in progress, or not available; the status may be received from the global communications application process. Returned data may include a list or array identifying recording files (e.g. a video ID) correlated with identifiers of the meeting or interaction associated with the recording, such as meeting ID or unique ID.

In operation 344; the polling process may filter recordings received in operation 342 and keep those whose start time is in the range of the first X minutes (e.g. the first 15 minutes) of when the relevant interaction being analyzed had its global database entry created, and discard others.

In operation 346; the polling process may sort the recordings received and kept as part of filtering, e.g. by ascending order of start time; the first entry may be selected. In one embodiment, a set of recordings possibly associated with a past meeting being processed is obtained, and the recording closest in time to the meeting, which may be deemed to be the earliest meeting on the sorted list of recordings starting after the meeting start time, is used.

In operation 348; the polling process may update the unique ID for this meeting in the relevant global database entry; the process may move to operation 350.

After receiving the unique ID and meeting ID, both may be compared with the existing centralized database or table entry, because it is possible that a user has instantiated a live meeting using a meeting ID older or different from the meeting ID used to set up the meeting. The unique ID may also be checked, because there is a possibility that the user has instantiated a meeting using a different meeting ID.

In operation 352, if the meeting ID sent in the response payload or query in operation 314 to the global communications application process matches the meeting ID sent to the global communications application process with the query, the process may move to operation 354; if not the process may move to operation 326.

In operation 354, the meeting entry matching the meeting ID in the centralized or global database is reviewed to determine if it has a unique identifier, e.g. UUID, entry; if it does have a unique identifier entry (e.g. UUID is not blank), the process may proceed to operation 356; if there is no unique identifier entry, e.g. the UUID is blank, the process may proceed to operation 358.

In operation 356, if the unique identifier, e.g. UUID, exists (e.g., is not blank), it is determined if the unique identifier in the relevant centralized database entry matches the unique identifier returned from the query to the meeting process global to the organization: if yes the process may move to box 358; if no the process may move to operation 360. If the unique identifier does match (yes) no additional save operation is performed on the database; however, an embodiment may proceed this way because the subsequent trigger point within it is responsible for recording a timestamp in the 'Last Live Meeting Time' column. Additionally, this method may be reused in the condition that the unique identifier blank (e.g. 'Is UUID blank?'): as per the example flow, the method is indeed invoked, but no update is made to the database since the value remains unchanged. This may be helpful since the unique identifier in the database may have been captured at an earlier time, and the process may ensure that the current live meeting corresponding to the entry is the same one for which the unique identifier was initially captured; otherwise the process may replace it with the new unique identifier which may lead to inconsistent correlation or assignment of interaction data such as videos to interactions or meetings.

In operation 358, if the unique identifier, e.g. UUID, has been found to be blank for the meeting queried in operation 354 from the global communications application process, or for another reason, the polling process may find the matching meeting ID in the database, and add to the relevant database entry having the meeting ID the unique identifier or identification (e.g. UUID) returned in a pair (e.g. UUID/ Zoom ID) from the global communications application process. In such a manner the unique identifier may be associated with the meeting ID.

In operation 370, for the relevant database entry that the unique identifier was updated for, the process may update an entry or column noting the last time a live meeting was detected for the meeting associated with this entry or the current time, or the time the table or database entry is being (e.g., is last being) updated, e.g. the current timestamp in coordinated universal time (UTC) or another time standard.

In operation 330, the polling process may call the global communications application process to obtain the status of the meeting being investigated. The polling process may identify the relevant meeting by sending the unique identifier (e.g. UUID) to the global communications application process. A returned status may be for example that a recording of the interaction or other interaction data (e.g. video and/or audio) has been completed or is available, or is still in progress, or not available yet; the status may be received from the global communications application process. Returned data may include a list or array identifying recording files (e.g. a video ID) correlated with identifiers of the meeting or interaction associated with the recording, such as meeting ID or unique ID. Such returned data may correlated interaction data such as video files or other data with the meeting or interaction described in the global database record being examined. In operation 330, 350, and 374 the unique identifier or identification of the interaction or meeting may be used to access, find, obtain, download and/or store interaction data associated with the interaction.

In operation 350, if the returned status is that interaction data such a recording is available, the process may move to operation 372; if not the process may move to operation 30X.

In operation 372; if there are multiple recordings (e.g. audio recordings or videos), the process may move to operation 376; if no the process may move to operation 374, where a single video is downloaded, and the process moves to operation 378. Multiple recordings may exist for one instantiation of an interaction if for example the interaction or meeting recording is paused then resumed.

An embodiment may deal with issues resulting from a recording not immediately being available after an interaction is completed. In some cases a recording is not available because a meeting is still occurring. To determine this, a process may compare the current time to a last live meeting time detected; if less than a certain period the process may wait (with respect to this meeting).

In operation 360, if the difference between the current time and the last live meeting time recorded in the global database for the interaction or meeting being analyzed is greater than a threshold, e.g. two hours, the process may proceed to operation 362; if not, the process may proceed to operation 364.

In operation 364, the process may update the status field in the global database entry for the interaction or meeting being processed to reprocessing, indicating the interaction has been processed and is not being "held" as being in-process or in-progress, and is also not new. The process may move to the next of the group of interactions or interaction records being processed (e.g. a batch of 10), or may terminate, to be re-started after a period of time.

In operation 362, if videos are present for this meeting, the process may move to operation 366, where the status in the global database for the interaction being processed may be set to "completed" or "complete" or a similar label, and the process may move to the next of the group of interactions or interaction records being processed, or may terminate. If videos are not present for this meeting the process may move to operation 368 where the status in the global database for the interaction being processed may be set to failure, an error message may be set to timeout, and the process may move to the next of the group of interactions or interaction records being processed, or may terminate.

In operation 376, all interaction data relevant to the unique ID such as recordings of interactions (e.g. video or audio) may be accessed, e.g. fetched or downloaded, from a data repository storing the recordings such as from a global communications application process (e.g. a Zoom process) to a storage file system or network folder such as a NAS, e.g. interaction repository 178. A NAS system may be organized by folders, each having a different name, for example corresponding to a specific recording. A unique ID and its meeting instance, may correspond to multiple recordings (For example in the case that a user pauses a recording and resumes a recording in the same meeting, thus making two recordings.). Folders may be created labelled by the recording ID (e.g., each folder corresponds to a recording). In such a manner, the unique identification of the interaction or meeting may be used to access or find interaction data such as a recording of, associated with, or having been correlated, with the interaction. Interaction data may be correlated to the interaction using, for example, a unique identifier determined using other interaction information, such as one or more of identification (e.g. e-mail of one or more participants, a meeting ID, or other information). The relevant recordings correlated to the meeting may be specified by sending the unique identifier (e.g. UUID) to the data repository, which may return the files for the recordings. Saved interaction recordings may be associated with metadata such as what type of recording or video (e.g. MP4), a link to download the recording, a unique ID and/or meeting ID associated with the recording, etc.

In operation 378, a recording may be transcribed, for example by being sent over an event messaging backbone such as the Apache Kafka event system to a Scalar processing system created by Morgan Stanley which may control a transcription process such as the Whisper AI system and a summary system such as an LLM (e.g. the ChatGPT system). A Scalar process may be a secondary service responsible for processing a recording file from the NAS location, for example as specified in a message posted to a Kafka event system. The Kafka message may contain the file's location, enabling a Scalar or other process to retrieve it. This service may process the file by sending it in chunks to a Whisper API for transcription. The resulting transcription may then be passed to an LLM such as ChatGPT, which may generate summaries such as an email summary and a meeting summary. These summaries may be subsequently sent back to a CRM system via a callback, where a note may be created against the respective client record.

Using the Scalar process or another process, a summarization tool may also be applied to summarize the transcription. The summaries may be sent to CRM system 154 to be saved as a note correlated to the correct parties (e.g. the client), and an e-mail summary of the meeting (e.g. to the client) may be created. In one embodiment, when a recording of an interaction is created, an entry is created in a database such as an SQL table storing for each recording, for example, the video ID (e.g. a unique identifier retrieved from a Zoom cloud for the specific recording ID) along with a 'Unique ID' column which may correspond to the unique ID column in the global previous table where meeting entries are initially inserted, and also the unique ID (e.g. UUID). Such a database entry may be created after the recording file has been successfully downloaded and a message has been sent to Kafka. The purpose of maintaining this record may be to ensure that the same video is not processed multiple times, thereby avoiding duplicate entries.

In operation 380, if the transcription process such as a Scalar system is not successful (e.g. no), the process may proceed to operation 364; if yes, the process may proceed to operation 382 where an interaction correlation database such as a OneNote Recording table, or other structure, may be updated to associate or correlate the meeting instance and one or more recordings, so that accessed interaction data associated with an interaction may be linked with the interaction. The interaction correlation database may include entries referring to a unique ID for an interaction contained in global table or database 174, and an interaction data identifier such as a recording ID (e.g. a unique identifier for each recording created by a Zoom platform). The recording may be fetched on the basis of, e.g., UUID, but in one embodiment the UUID value itself is not placed in the correlation database, but rather remains in global table or database 174. The interaction correlation database may hold the relevant unique ID, to form a correlation between database 174 and the recording ID, which may be the unique identifier documenting the fact that the relevant recording was downloaded from, e.g. a Zoom platform, and sent for processing. After this database update, the process may proceed to operation 360.

Other operations or series of operations may be used.

Table 1 below shows an example JSON payload used to query or create a query to a global communications application process. For example, information in Table 1 may be sent from a CRM system to a database system, then used by a polling process 172 to query a global Zoom process.

{
    "TransactionInfo": {
        "UseCaseName": "SF-RecordMeeting",
        "TransactionUserRacf": "P85YBH",
        "TransactionUser": null,
        "TransactionTimeStamp": "2025-04-08T20:34:
           10.548Z",
        "TransactionSource": null,
        "EventSource": "SF-MVR",
        "EventCorrelationId": "{2025-04-08T20:34:
           10.549Z} {SF} {MVR}"
    },
    "ProductName": "Zoom",
    "ParticipantsList": [
        {
           "IdValue": "0030400000MdlGu",
           "IdType": "SF-Primary",
           "LastName": "Smith",
           "FirstName": "Jane"
        }
    ],
    "MeetingSubject": "Automated_notes_test-
        ing_1251844656",
    "MeetingStartTimestamp": "2025-04-08T21:00:00Z",
    "MeetingOwnerName": {
        "LastName": "Frank",
        "FirstName": "Jones"
    },
    "MeetingOwnerEmailId": "f.kumar@domain.com",
    "MeetingOwnerMSID": "85YBH",
    "MeetingInfo": {
        "Platform": "Zoom",
          "MeetingPin": null,
          "MeetingId": "5507973103",
          "SectionId": " ",
          "PageId": " "
    },
    "MeetingEndTimestamp": "2025-04-08T22:00:00Z",
    "LastRecordingInfo": {
        "NewRecordingFlag": false,
        "LastVideoId": " "
    },
    "Identifier": [

```
{
    "IdValue": "00UDc000002Q7tTMAS",
    "IdType": "EventId"
},
{
    "IdValue": null,
    "IdType": "VideoId"
}
],
"Channel": "SALESFORCE"
}
```
Table 1

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for correlating interaction data to interactions, the method comprising:

transmitting, for an entry of a table including a plurality of entries, an identifier of a participant in a communications application interaction to a global communications application process, wherein each entry of the plurality of entries is created for an instance of an interaction of a plurality of instances, wherein two or more of the plurality of instances correspond to a single interaction;

receiving from the global communications application process a unique identification associated with the interaction, wherein the unique identification associated with the interaction is transmitted by the global communications application process in response to the transmitted identifier of the participant; and using the unique identification of the interaction to access interaction data associated with the interaction.

2. The method of claim 1, wherein the unique identification identifies an instance of the plurality of instances, the identified instance associated with the interaction.

3. The method of claim 1, comprising, on the start of an interaction instance, creating a new entry in the table and associating an interaction ID created in conjunction with the scheduling of an interaction with the entry.

4. The method of claim 1, comprising adding the unique identification to the new entry.

5. The method of claim 1, wherein the interaction is a videoconference meeting.

6. The method of claim 1, wherein interaction data is a recording of the interaction.

7. The method of claim 1, wherein the transmitting of the identifier and accessing interaction data is performed by a process repeatedly executing and terminating, wherein a plurality of such processes execute concurrently.

8. A system for correlating interaction data to interactions, the system comprising:

a memory and;

a processor to:

transmit, for an entry of a table including a plurality of entries, an identifier of a participant in a communications application interaction to a global communications application process, wherein each entry of the plurality of entries is created for an instance of an interaction of a plurality of instances, wherein two or more of the plurality of instances correspond to a single interaction;

receive from the global communications application process a unique identification associated with the interaction, wherein the unique identification associated with the interaction is transmitted by the global communications application process in response to the transmitted identifier of the participant; and use the unique identification of the interaction to access interaction data associated with the interaction.

9. The system of claim 8, wherein the unique identification identifies an instance of the plurality of instances, the identified instance associated with the interaction.

10. The system of claim 8, wherein the processor is to, on the start of an interaction instance, create a new entry in the table and associate an interaction ID created in conjunction with the scheduling of an interaction with the entry.

11. The system of claim 8, wherein the processor is to add the unique identification to the new entry.

12. The system of claim 8, wherein the interaction is a videoconference meeting.

13. The system of claim 8, wherein interaction data is a recording of the interaction.

14. The system of claim 8, wherein the transmitting of the identifier and accessing interaction data is performed by a process repeatedly executing and terminating, wherein a plurality of such processes execute concurrently, executed by a plurality of systems each including a memory and a processor.

15. A method for associating meeting recording data to meetings, the method comprising:

transmitting, for an entry of a table including a plurality of entries, an identifier associated with a communications application meeting to a global communications process, wherein each entry of the plurality of entries is created for an instance of a meeting of a plurality of instances, wherein two or more of the plurality of instances correspond to a single meeting;

the global communications process responding to the identifier with a unique identification associated with the meeting, wherein the unique identification associated with the meeting is transmitted by the global communications process in response to the transmitted identifier associated with the communications application meeting; and using the unique identification to find interaction data associated with the meeting.

16. The method of claim 15, wherein the unique identification identifies an instance of the plurality of instances, the identified instance associated with the meeting.

17. The method of claim 15, comprising, on the start of a meeting instance, creating a new entry in the table and associating a meeting ID created in conjunction with the scheduling of a meeting with the entry.

18. The method of claim 15, comprising adding the unique identification to the new entry.

19. The method of claim 15, wherein the meeting is a videoconference meeting.

20. The method of claim 15, wherein interaction data is a recording of the meeting.

\* \* \* \* \*